US010907713B2

(12) United States Patent
Ilk et al.

(10) Patent No.: US 10,907,713 B2
(45) Date of Patent: Feb. 2, 2021

(54) TRANSMISSION ARRANGEMENT, TRAVEL DRIVE HAVING THE TRANSMISSION ARRANGEMENT AND METHOD FOR CONTROLLING THE TRANSMISSION ARRANGEMENT

(71) Applicant: Robert Bosch GmbH, Stuttgart (DE)

(72) Inventors: Erich Ilk, Augsburg (DE); Norman Brix, Leipheim (DE); Ulrich Lenzgeiger, Dinkelscherben (DE)

(73) Assignee: Robert Bosch GmbH, Stuttgart (DE)

( * ) Notice: Subject to any disclaimer, the term of this patent is extended or adjusted under 35 U.S.C. 154(b) by 679 days.

(21) Appl. No.: 15/684,186

(22) Filed: Aug. 23, 2017

(65) Prior Publication Data

US 2018/0058563 A1 Mar. 1, 2018

(30) Foreign Application Priority Data

Aug. 25, 2016 (DE) .......................... 10 2016 215 992

(51) Int. Cl.
| | |
|---|---|
| *F16H 47/02* | (2006.01) |
| *F16H 61/42* | (2010.01) |
| *F16H 61/70* | (2006.01) |
| *F16H 59/68* | (2006.01) |
| *F16H 61/682* | (2006.01) |

(52) U.S. Cl.
CPC ............ *F16H 47/02* (2013.01); *F16H 61/42* (2013.01); *F16H 61/682* (2013.01); *F16H 61/702* (2013.01); *F16H 59/68* (2013.01); *F16H 2059/6853* (2013.01)

(58) Field of Classification Search
CPC ........ F16H 47/02; F16H 61/42; F16H 61/682; F16H 61/702; F16H 59/68; F16H 2059/6853
USPC ........................................................ 74/731.1
See application file for complete search history.

(56) References Cited

U.S. PATENT DOCUMENTS

| | | | | | |
|---|---|---|---|---|---|
| 4,939,954 | A | * | 7/1990 | Walzer ................... | B60W 30/18 477/68 |
| 4,947,687 | A | * | 8/1990 | Martini ................... | F16H 47/02 477/68 |
| 4,967,610 | A | * | 11/1990 | Sasajima ............. | F16H 61/4157 477/119 |

(Continued)

*Primary Examiner* — Ha Dinh Ho
(74) *Attorney, Agent, or Firm* — Maginot, Moore & Beck LLP

(57) ABSTRACT

A transmission arrangement for a travel drive, in particular a mobile machine, includes a first hydraulic machine configured to be coupled to a drive machine, and a second hydraulic machine having an adjustable second expulsion volume, the second hydraulic machine configured to be connected fluidically to the first hydraulic machine via a first working line and a second working line of the transmission arrangement. The second hydraulic machine configured to be coupled or is coupled to a manual transmission of the transmission arrangement. The manual transmission has at least two transmission stages, and coupling of the second hydraulic machine to the manual transmission has the result that a torque can be transmitted. The transmission arrangement further includes a control apparatus configured to reduce to zero or to nearly zero the second expulsion volume at least during a changeover from one transmission stage to another transmission stage of the manual transmission.

5 Claims, 2 Drawing Sheets

(56) References Cited

U.S. PATENT DOCUMENTS

| | | | | |
|---|---|---|---|---|
| 5,071,391 A | * | 12/1991 | Kita | ............... F16H 47/04 |
| | | | | 475/80 |
| 5,505,113 A | * | 4/1996 | Wiest | ............... F16H 47/02 |
| | | | | 477/52 |
| 6,202,016 B1 | * | 3/2001 | Stephenson | ...... F16H 61/0403 |
| | | | | 475/121 |
| 6,857,986 B2 | * | 2/2005 | Ikari | ............... F16H 61/423 |
| | | | | 477/64 |

* cited by examiner

TRANSMISSION ARRANGEMENT, TRAVEL DRIVE HAVING THE TRANSMISSION ARRANGEMENT AND METHOD FOR CONTROLLING THE TRANSMISSION ARRANGEMENT

This application claims priority under 35 U.S.C. § 119 to patent application no. DE 10 2016 215 992.5, filed on Aug. 25, 2016 in Germany, the disclosure of which is incorporated herein by reference in its entirety.

The disclosure relates to a transmission arrangement, to a travel drive, and to a method for controlling the transmission arrangement.

BACKGROUND

A transmission arrangement having a hydrostatic transmission and a mechanical manual transmission which is coupled in series therewith is used in travel drives, for example those of agricultural machines or mobile machines. Automation permits transmission stages of the manual transmission of such transmission arrangements to shift even during travel. For this purpose, the torque between the hydraulic motor of the hydrostatic transmission and the transmission input of the manual transmission is lowered to zero. This is done by reducing the expulsion volume of the hydraulic motor to zero ("zero oscillation"). When the zero expulsion volume is reached, the old transmission stage is disengaged and the new transmission stage is engaged by means of mechanical synchronization. A synchronizing ring which is provided for this is configured in such a way that it can take up sufficient frictional energy to accelerate the moment of mass inertia of the hydraulic motor to the synchronizing rotational speed with the transmission output of the manual transmission. However, this requires the hydraulic motor to continue to have the zero expulsion volume in order to avoid counteracting the synchronization with a torque. If the torque were instead to continue, this would allow the frictional energy to be absorbed by the synchronizing ring to increase and over time damage the synchronizing ring.

Conventional transmission arrangements of the generic type therefore have a hydraulic motor which can be adjusted to zero expulsion volume. For the changeover of the transmission stages a time period is additionally parameterized in a control apparatus of these transmission arrangements, said time period starting to run with a predefined setpoint value for the zero expulsion volume and being dimensioned in such a way that after its expiry it can be assumed with a high degree of probability that the zero expulsion volume is present. The shifting process can then take place. However, this time-parameterized procedure entails the risk that owing to technical defects after the expiry of the time period there is still a finite expulsion volume, and therefore a torque, present. If the shift then takes place nevertheless, that is to say under load, this can lead to damage to the transmission.

SUMMARY

In contrast with the above, the disclosure is based on the object of providing a hydrostatic transmission arrangement which can be shifted with greater process reliability. Furthermore, the object is to provide a travel drive having the transmission arrangement and a method for controlling the transmission arrangement.

The first object is achieved by means of a transmission arrangement having the features disclosed herein, the second object by means of a hydrostatic travel drive having the features disclosed herein, and the third object by means of a method having the features disclosed herein.

Advantageous developments of the transmission arrangement and the corresponding method are described herein.

A transmission arrangement for a travel drive, in particular for that of a mobile machine, for example of a wheel loader, has a first hydraulic machine which can be coupled to a drive machine of the travel drive, and a second hydraulic machine which has an adjustable second expulsion volume. Said second hydraulic machine can be connected, in particular is connected, fluidically to the first hydraulic machine via a first working line and a second working line of the transmission arrangement. In this context, the second hydraulic machine can be coupled or is coupled to a manual transmission, having at least two transmission stages, of the transmission arrangement, with the result that a torque can be transmitted between the transmissions. In addition, the transmission arrangement has a control apparatus by means of which the second expulsion volume can be reduced to zero, or at least nearly zero, at least during a changeover from one of the transmission stages to the respective other one. According to the disclosure, in this context a detection unit is provided, by means of which it can be detected whether the second expulsion volume has a value of zero or a value close to zero.

By means of this detection unit it can be reliably determined whether the input shaft of the manual transmission is actually free of torque. This is the case when the second expulsion volume is zero or has only such a small value that the second hydraulic machine is dragged hydraulically and therefore no drag torque is present between the manual transmission and the second hydraulic machine. As a result, the shifting process is more reliable in terms of process.

In one development, the detection unit is formed by a position detection unit, in particular by a proximity switch or proximity sensor which is less costly in terms of device technology.

In one development, the second hydraulic machine has a drive shaft which can be coupled to the manual transmission and a cylinder drum which is connected thereto in a rotationally fixed fashion, wherein a rotational axis of the cylinder drum can be pivoted toward a rotational axis of the drive shaft with a pivoting angle.

A hydrostatic travel drive has a transmission arrangement which is configured according to at least one of the aspects of the description above. In this context, the first hydraulic machine is coupled to the drive machine, and the output shaft of the manual transmission is coupled to wheels or an axle of the travel drive.

A method for controlling the transmission arrangement, in particular for changing over the transmission stages, has steps of "requesting a changeover of the engaged transmission stage", "setting a setpoint value signal of the second expulsion volume to zero", and "detecting whether an actual value of the second expulsion volume of zero is present, by means of the detection unit".

In one development of the method, the latter has a step of "enabling the changeover of the transmission stages if the actual value zero is present", and, if appropriate, additionally a step of "aborting the changeover of the transmission stages if an actual value which is unequal to zero is present".

BRIEF DESCRIPTION OF THE DRAWINGS

An exemplary embodiment of a travel drive according to the disclosure having a transmission arrangement according to the disclosure, and an exemplary embodiment of a method for controlling the transmission arrangement, are illustrated in the drawings. The disclosure will now be explained in more detail with reference to the figures of these drawings, in which.

DETAILED DESCRIPTION

Figure 1:
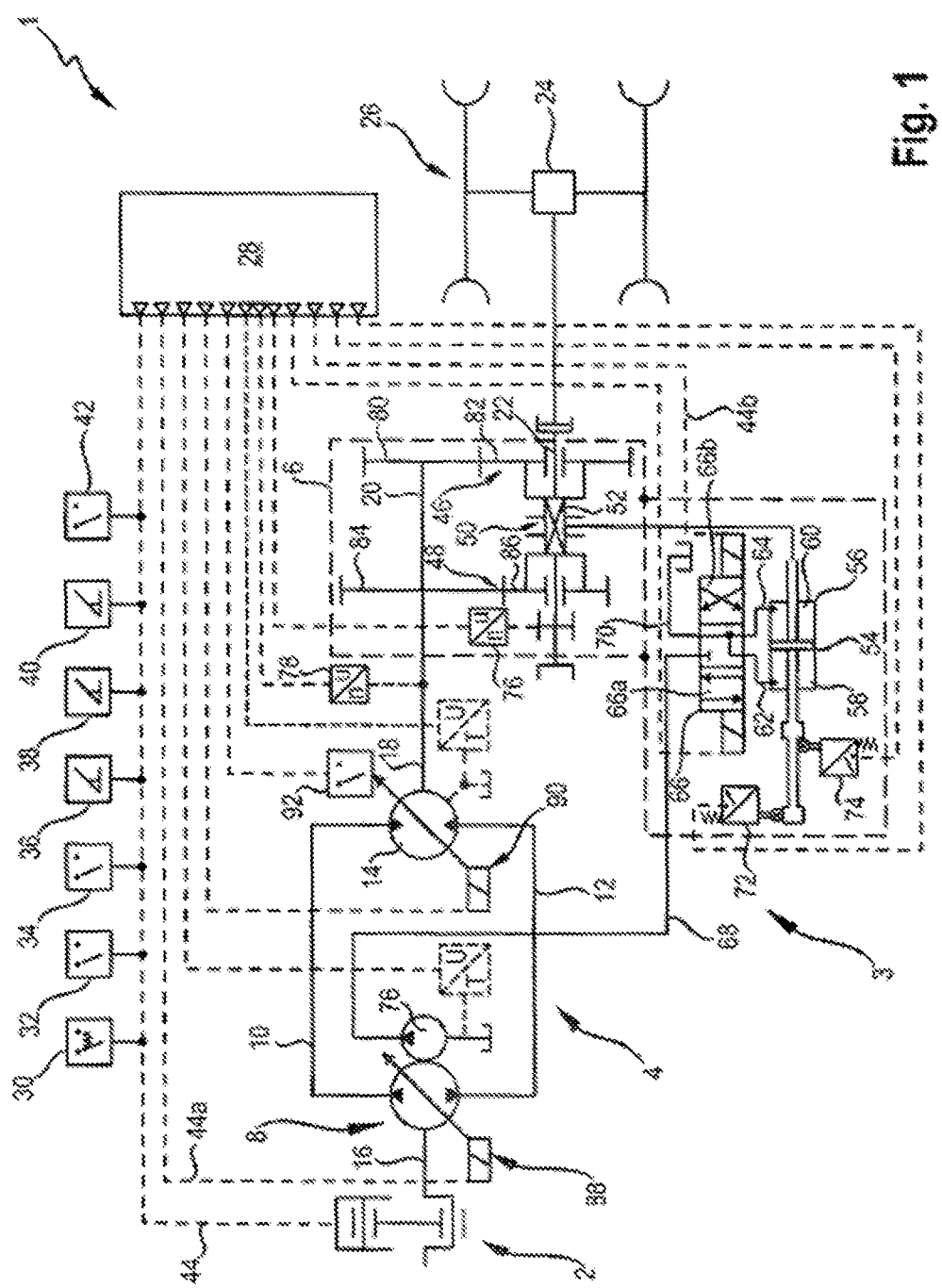
FIG. 1 shows a circuit diagram of an exemplary embodiment of a travel drive.

According to FIG. 1, a travel drive 1, for example that of a mobile machine, has a transmission arrangement 3 with a drive machine 2 which is embodied as a diesel engine, a hydrostatic transmission 4 and a two-stage (in the exemplary embodiment) manual transmission 6. The hydrostatic transmission 4 has a first hydraulic machine 8 which is configured as an axial piston pump with a swash plate design, which is fluidically connected, in a closed, hydraulic circuit, via two working lines 10, 12 to a second hydraulic machine 14, embodied as an axial piston motor with a swash plate design. The first hydraulic machine 8 is coupled via a motor shaft 16 to the drive machine 2. A drive shaft 18 of the second hydraulic machine 14 is coupled to an input shaft 20 of the manual transmission 6. An output shaft 22 of the manual transmission 6 is coupled to a differential 24 of a two-wheeled axle 26 of the travel drive 1. The two hydraulic machines 8, 14 each have an adjustable expulsion volume. The first hydraulic machine 8 is configured here in such a way that it can operate both as a hydraulic pump and as a hydraulic motor in all four quadrants, in both directions of torque. The second hydraulic machine 14 has its adjustment range only between a zero expulsion volume and a positive maximum value.

Furthermore, the transmission arrangement 3 has a control apparatus 28, in particular for controlling the torque of the drive shaft 18 and of the transmission input shaft 20, and the expulsion volumes of the hydraulic machines 8, 14. A shifting request apparatus 30, a gear speed selection apparatus 32, a direction of travel selection apparatus 34, an accelerator pedal 36, a creeping gear speed selection apparatus 38, a brake pedal 40 and an automatic selection apparatus 42 are connected in terms of signaling to the control apparatus 28. All the specified apparatuses 30 to 42 are connected in terms of signaling via a CAN bus 44, both to the control apparatus 28 and at least to the drive machine 2.

The manual transmission 6 has a first transmission stage 46 with a low transmission ratio, and a second transmission stage 48 with a relatively high transmission ratio of the rotational speed $n_A$ of the output shaft 23 with respect to the rotational speed $n_{HM}$ of the input shaft 18. Furthermore, the manual transmission 6 has a dog clutch 50 which is configured without a synchronizing ring. An actuator 52 of the dog clutch 50 is rigidly coupled to a piston 54 of an actuation cylinder 56.

The latter has two identical pressure medium spaces 58, 60 which are separate from the piston 54 and are connected via control lines 62, 64 to a 4/3 switching valve 66 which can be actuated electromagnetically. The latter has a first switched position 66a in which the first pressure space 58 is connected to a pressure medium line 68, and the second pressure space 60 is connected to a reservoir line 70. In a second switched position 66b, the second pressure medium space 60 is connected to the pressure medium line 68, and the first pressure medium space 58 is connected to the reservoir line 70. The first switched position 66a brings about displacement of the piston 54 here in such a way that the first transmission stage 46 is engaged by means of the dog clutch 50 and brings about the second switched position 66b, and that the second transmission stage 48 is engaged by means of the piston 54 and the dog clutch 50.

The 4/3 switching valve 66 and the actuation cylinder 56 are combined to form a unit. This unit also has two end position switches 72, 74 by means of which the successful shifting of the respective transmission stage 46, 48 can be identified on the basis of the position of the piston 54. The two end position switches 72, 74 are each connected via a signal line to the control apparatus 28. The 4/3-way switching valve 66 is connected to a feed pump 76 via the pressure medium line 68.

The hydrostatic transmission 4 has a variable, continuously adjustable transmission ratio range. The manual transmission 6 which is connected downstream of the latter serves to cover a necessary speed range of the travel drive 1. The transmission arrangement 3 is configured here in such a way that the manual transmission 6 can be shifted during the travel operation.

The shifting or changing over of the transmission stages 46, 48 can be controlled in an automated fashion by means of the control apparatus 28. For this purpose, the transmission arrangement 3 has a rotational speed sensor 76 by means of which the rotational speed $n_A$ of the output shaft 22 can be detected. In addition, it has a rotational speed sensor 78 for detecting the rotational speed $n_{HM}$ of the input shaft 18. Furthermore, the second hydraulic machine 14 has a position detection unit 92 which is configured as a proximity switch and by means of which the zero expulsion volume of the second hydraulic machine 14 can be detected.

The first transmission stage 46 has a gear wheel 80 which is fixedly coupled to the input shaft 20 and is in permanent engagement with an idler wheel 82 which can be coupled to the output shaft 22 via the dog clutch 50. Correspondingly, the second transmission stage 48 has a gear wheel 84 which is fixedly coupled to the input shaft 20, and an idler wheel 86 which is permanently engaged therewith and can be coupled to the output shaft 22 by means of the dog clutch 50.

According to FIG. 1, the first hydraulic machine 8 has an adjustment unit 88 for adjusting its first expulsion volume $V_{HP}$, and the second hydraulic machine 14 has an adjustment apparatus 90 for adjusting its second expulsion volume $V_{HM}$. The adjustment apparatus 90 operates here electro-proportionally (EP adjustment). In order to adjust a cradle of the second hydraulic machine 14, and therefore the second expulsion volume $V_{HM}$, the adjustment apparatus 90 has a hydraulic actuation cylinder, the pressure spaces of which, which are effective in a reciprocal fashion, can each be supplied with pressure medium via an electro-proportionally adjustable pressure regulating valve. The electro-proportional adjustment permits infinitely variable adjustment of the expulsion volume $V_{HM}$. In this context, the adjustment takes place proportionally with respect to the applied electrical actuation current $I_{HM}$. The regulation can have a positive identifier here, which is equivalent to meaning that a start of regulation occurs at minimum actuation current at a minimum expulsion volume $V_{HMmin}$, and an end of regulation occurs at maximum actuation current and a maximum expulsion volume $V_{HMmax}$. Alternatively, a regulation with a negative identifier is possible. An advantage of this control concept for the second hydraulic machine 14 is that the actual second expulsion volume $V_{HM}$ corresponds essentially to the setpoint value $V_{HMsetp}$, requested by the control apparatus 28, of the second hydraulic machine 14.

The second expulsion volume $V_{HM}$ is therefore theoretically essentially known at any point in time of the regulation process. Since the value of the expulsion volume $V_{HM}$ of the second hydraulic machine 14 is not detected but rather assumed, the position detection unit 92 is provided. The latter can detect/check at least the important state in which freedom from torque of the input shaft 20 is requested for shifting, which is achieved in the exemplary embodiment by the zero expulsion volume $V_{HM0}$ of the second hydraulic machine 14.

Figure 2:
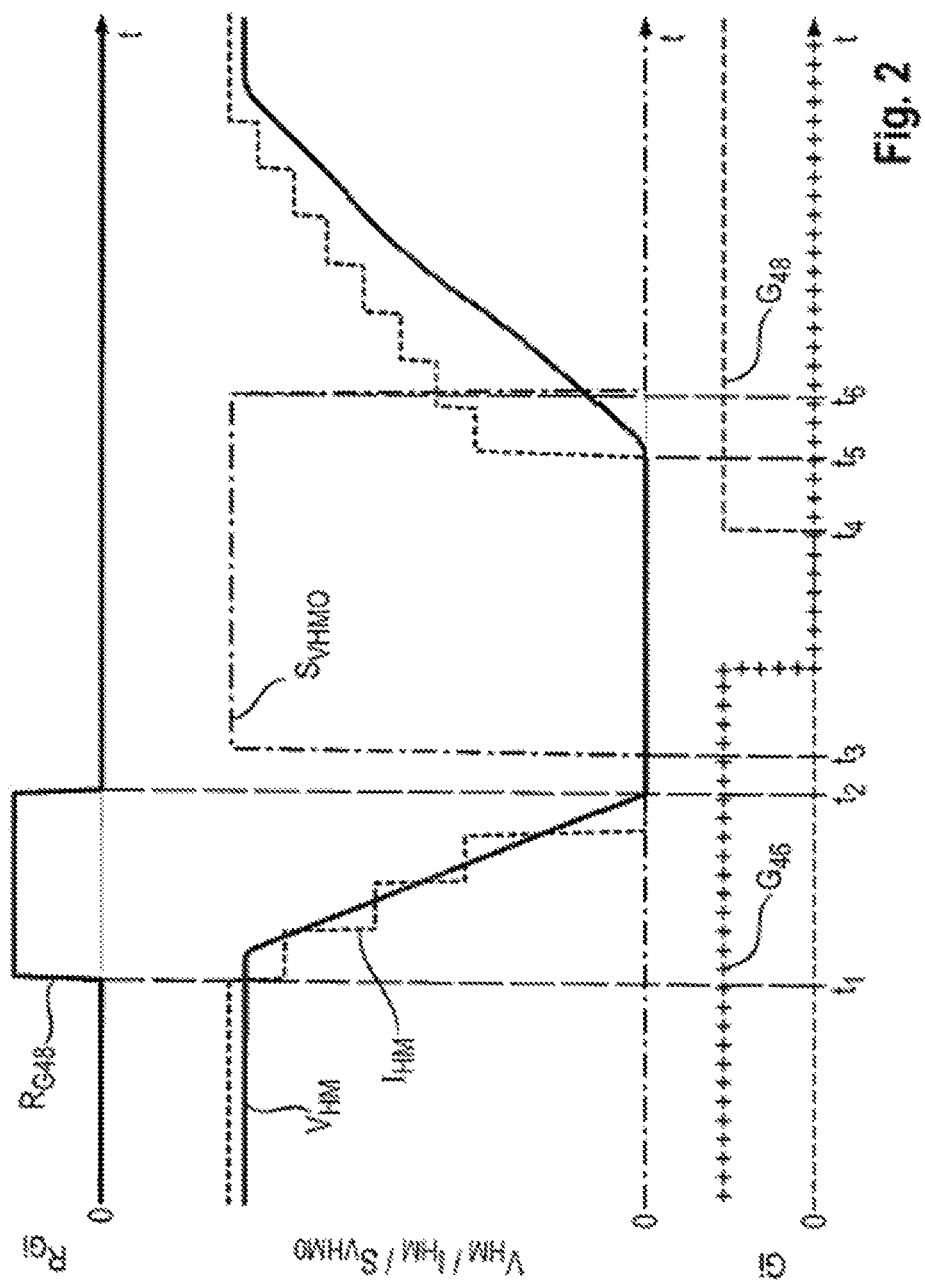
FIG. 2 shows a time diagram of an exemplary embodiment of a control method.

FIG. 2 then shows the time profile of a shifting process from the first transmission stage 46 into the second transmission stage 48 according to FIG. 1. A shifting request $R_{Gi}$ with the specific profile of the shifting request for the second transmission stage 48 ($R_{G48}$) is illustrated from top to bottom. Furthermore, the time profile of the second expulsion volume $V_{HM}$ of the second hydraulic machine 14, of the actuation current $I_{HM}$ for adjusting the second expulsion volume $V_{HM}$ of the second hydraulic machine 14 and, superimposed on the two last-mentioned profiles in the same diagram, the output signal $S_{VHM0}$ of the position detection unit 92 which is configured as proximity switch, by means of which the zero position of the cradle of the second hydraulic machine 14 is detected. In the very bottom part of the diagram according to FIG. 2, the time profile of the respectively engaged transmission stage $G_i$ with the changeover from the first transmission stage 46 to the second transmission stage 48 is illustrated.

Starting from a point in time $t_0$, at which according to FIG. 2 the first transmission stage 46 is engaged, the adjustment apparatus 90 of the second hydraulic machine 14 is energized with the maximum current $I_{HM}$, and the expulsion volume of the second hydraulic machine $V_{HM}$ is at a maximum, there is no shifting request $R_{Gi}$ present at all. The request $R_{G48}$ according to FIG. 2 is made by means of the gear speed selection apparatus 32 according to FIG. 1. As a result, the control apparatus 28 lowers the actuation current $I_{HM}$ of the adjustment apparatus 90 according to FIG. 2 in stages so that the cradle of the second hydraulic machine 14 is reset according to the profile $V_{HM}$ according to FIG. 2 in the direction θ. The expulsion volume $V_{HM}=0$ is reached by the second hydraulic machine 14 at the point in time $t_2$. At this point in time the first transmission stage 46 is still engaged. After a short dwell time, at a point in time $t_3$ the position detection unit 92 detects this zero position of the cradle of the second hydraulic machine 14 and outputs the corresponding signal to the control apparatus 28 according to FIG. 1. It is thus then known with high reliability that the input shaft 20 of the manual transmission 6 is free of torque and the shifting process into the second transmission stage 48 can therefore take place without damage.

For this purpose, the dog clutch 50, to be more precise the actuator 52 thereof, is firstly shifted hydraulically into a neutral position by means of the control apparatus 28 according to FIG. 1. In this position the synchronization of the input shaft 20 (drive shaft 18) with the output shaft 22 takes place. If the rotational speeds of the input shaft 20 and of the output shaft 22 are synchronized according to the new transmission ratio of the second transmission stage 48, which can be checked by means of the rotational speed detection units 76, 78 and the control apparatus 28, the control apparatus 28 switches the 4/3-way switching valve 66 into its second switched position 66b. The second pressure medium space 60 is then supplied with pressure medium from the pressure medium line 68, and the piston 54 moves the actuator 52, and therefore the dog clutch, into the idler wheel 86, as a result of which the output shaft 22 is connected in a rotationally fixed fashion to the idler wheel 86, and the second transmission stage 48 is shifted. This corresponds to the point in time $t_4$.

After a short time period, at the point in time $t_5$, the incremental raising of the actuation current $I_{HM}$ of the adjustment apparatus 90 according to FIG. 2 takes place. Correspondingly, the second expulsion volume $V_{HM}$ of the second hydraulic machine 14 follows and rises. With a certain delay, at the point in time $t_6$, this rise is detected by the position detection unit 92, after which the signal $S_{VHM0}$ of which drops and it is therefore signaled to the control apparatus that the second expulsion volume $V_{HM}$ is unequal to zero.

The described sequence according to FIG. 2 describes a method for reliably detecting a loadless or torque-free state of the second hydraulic machine 14 which drives the manual transmission 6. This load-free state can be detected reliably in terms of process by means of the position detection unit 92, with the result that compared to conventional, time-based, approximated actuations the strong variance of said actuations as a result of temperature, adjustment pressure or series variation is eliminated. Furthermore, compared to conventional, time-based actuation, the advantage is obtained that the shifting time is shortened. If the parameterization of the shifting process in the case of the specified conventional actuation still has to take place in a comparatively conservative fashion, with a safety time margin, said parameterization can then take place precisely when the input shaft 20 is actually free of torque. An interruption in tractive force which is associated with the shifting process is therefore minimized, with the result that critical situations which result therefrom now also occur only rarely.

In summary, the shifting process of the transmission stages 46, 48 by means of the position detection unit 92 is robust and comfortable. This increases the durability of the respective transmission components.

The specified position detection unit 92 also provides a further advantage which is that if, owing to technical defects (for example of the second hydraulic machine 14 or its adjustment apparatus 90), the expulsion volume $V_{HM}$ does not swing in the direction of zero despite a shifting request $R_{Gi}$ being present, this state can then be detected. As a result, the control apparatus 28 can then prevent shifting from occurring despite a shifting request $R_{Gi}$. This protects the manual transmission 6 from damage.

A transmission arrangement having a hydrostatic transmission and a manual transmission coupled in series therewith are disclosed. In this context, that hydraulic machine which has the coupling to the manual transmission has an adjustable expulsion volume which can be adjusted to zero in order to change over transmission stages of the manual transmission, as a result of which the manual transmission can be synchronized free of torque. In order to be able to reliably detect the torque-free state, the transmission arrangement has a detection unit by means of which it can at least be detected, indirectly or directly, whether an actual value of the expulsion volume is equal to zero or whether the actual value unequal to zero not.

Also disclosed are a travel drive having such a transmission arrangement and a method for controlling the transmission arrangement in which, before enabling a requested changeover of the transmission stages, it is checked whether the specified actual value is equal to zero or unequal to zero.

LIST OF REFERENCE NUMBERS

1 Travel drive
2 Drive machine

3 Transmission arrangement
4 Hydrostatic transmission
6 Manual transmission
8 First hydraulic machine
10 First working line
12 Second working line
14 Second hydraulic machine
16 Motor shaft
18 Drive shaft
20 Input shaft
22 Output shaft
24 Differential
26 Axle
28 Control apparatus
30 Pivoting angle detection unit
32 Gear speed selection apparatus
34 Direction of travel selection apparatus
36 Accelerator pedal
38 Creeping gear speed selection apparatus
40 Brake pedal
42 Automatic selection apparatus
44 CAN bus
44a; 44b Signal line
46 First transmission stage
48 Second transmission stage
50 Dog clutch
52 Actuator
54 Piston
56 Actuation cylinder
58 First pressure space
60 Second pressure space
62, 64 Control line
66 4/3-way switching valve
66a First switched position
66b Second switched position
68 Pressure medium line
70 Reservoir line
72, 74 End position switch
76, 78 Rotational speed sensor
80, 84 Gear wheel
82, 86 Idler wheel
88 Adjustment apparatus
90 Adjustment apparatus
92 Position detection unit

What is claimed is:

1. A transmission arrangement for a travel drive comprising:
a first hydraulic machine configured to be coupled to a drive machine;
a second hydraulic machine having an adjustable second expulsion volume, the second hydraulic machine configured to be connected fluidically to the first hydraulic machine via a first working line of the transmission arrangement and a second working line of the transmission arrangement, the second hydraulic machine further configured to be coupled to
a manual transmission to which the second hydraulic machine is coupled such that the second hydraulic machine transmits torque to the manual transmission, the manual transmission having at least two transmission stages;
a detection unit including a proximity switch or a proximity sensor configured to detect whether the second expulsion volume is zero or nearly zero; and
a control apparatus configured to receive a changeover request for the manual transmission, set a setpoint value of the second expulsion volume to zero or to nearly zero, receive a signal from the detection unit corresponding to an actual value indicative of whether the second expulsion value is zero or nearly zero, and to enable changeover of gear stages only if the actual value corresponds to zero or nearly zero.

2. The transmission arrangement according to claim 1, wherein:
the second hydraulic machine includes a drive shaft configured to be coupled to the manual transmission and a cylinder drum which is connected thereto in a rotationally fixed fashion, and
a rotational axis of the cylinder drum is pivotable toward a rotational axis of the drive shaft with a pivoting angle.

3. The transmission arrangement according to claim 1, wherein the transmission arrangement is included in a hydrostatic travel drive.

4. A method for changing over transmission stages of a transmission arrangement, comprising:
requesting a changeover of an engaged transmission stage of a manual transmisssion;
setting, with a control apparatus, a setpoint value signal of a second expulsion volume of a second hydraulic machine of the transmission arrangement to zero, the second hydraulic machine connected fluidically to a first hydraulic machine, which is coupled to a drive machine, via first and second working lines, and the second hydraulic machine coupled to the manual transmission so as to transmit torque to the manual transmission; and
detecting whether an actual value of the second expulsion volume is zero or nearly zero with a proximity sensor or proximity switch of a detection unit of the transmission arrangement; and
enabling changeover of the manual transmission to a different transmission stage only if the detected actual value is zero or nearly zero.

5. The method according to claim 4, further comprising:
aborting the changeover of the manual transmission to the different transmission stage if the actual value is unequal to zero or nearly zero.

* * * * *